US007359542B2

(12) United States Patent
Oosawa

(10) Patent No.: US 7,359,542 B2
(45) Date of Patent: Apr. 15, 2008

(54) METHOD AND APPARATUS FOR DETECTING ANOMALOUS SHADOWS

(75) Inventor: Akira Oosawa, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 573 days.

(21) Appl. No.: 09/988,658

(22) Filed: Nov. 20, 2001

(65) Prior Publication Data

US 2002/0090126 A1 Jul. 11, 2002

(30) Foreign Application Priority Data

Nov. 20, 2000 (JP) ............................. 2000-352119

(51) Int. Cl.
| G06K 9/00 | (2006.01) |
| G06K 9/46 | (2006.01) |
| G06K 9/40 | (2006.01) |
| G06K 9/60 | (2006.01) |

(52) U.S. Cl. ...................... 382/132; 382/190; 382/275; 382/308

(58) Field of Classification Search ................. 382/132
See application file for complete search history.

(56) References Cited

U.S. PATENT DOCUMENTS

| 5,289,374 | A | * | 2/1994 | Doi et al. ................... 600/407 |
| 5,359,513 | A | * | 10/1994 | Kano et al. .................. 382/128 |
| 5,937,111 | A | * | 8/1999 | Yamada ....................... 382/308 |
| 5,970,182 | A | * | 10/1999 | Goris ........................... 382/278 |
| 5,982,915 | A | * | 11/1999 | Doi et al. .................... 382/130 |
| 5,982,953 | A | | 11/1999 | Yanagita et al. |
| 6,014,474 | A | | 1/2000 | Takeo et al. |
| 6,125,214 | A | | 9/2000 | Takeo et al. |
| 6,125,215 | A | | 9/2000 | Takeo et al. |
| 6,137,923 | A | | 10/2000 | Takeo et al. |
| 6,141,437 | A | | 10/2000 | Xu et al. |
| 6,169,823 | B1 | | 1/2001 | Takeo et al. |
| 6,233,362 | B1 | | 5/2001 | Takeo et al. |
| 6,594,378 | B1 | * | 7/2003 | Li et al. ...................... 382/128 |

FOREIGN PATENT DOCUMENTS

| JP | 8-77329 A | 3/1996 |
| JP | 8-272961 A | 10/1996 |
| JP | 9-91421 A | 4/1997 |
| JP | 9-185714 A | 7/1997 |
| JP | 9-248291 A | 9/1997 |

OTHER PUBLICATIONS

Jatko, et al, "Nonlinear Filter derived from topological image features", SPIE vol. 1295 Real-Time Image Processing II, 1990, pp. 8-16.*

(Continued)

*Primary Examiner*—Bhavesh M Mehta
*Assistant Examiner*—Charles Kim
(74) *Attorney, Agent, or Firm*—Sughrue Mion, PLLC

(57) ABSTRACT

A method and apparatus for accurately detecting the anomalous shadows occurring within an interimage image based on two or more images obtained of the same subject, wherein the artifacts occurring in the interimage image are reduced, is provided. A temporal subtraction image formed by an interimage processing means is subjected to a morphology process wherein the artifacts occurring in the interimage image are suppressed relative to the actual difference between the two images on which the temporal subtraction image is based. A detecting means detects the suspected anomalous shadows occurring within the temporal subtraction image that has been subjected to an artifact-suppressing morphology process.

18 Claims, 19 Drawing Sheets

OTHER PUBLICATIONS

English Language Abstract JP l9091421, Apr. 4, 1997.
Patent Abstract of Japan 08-077329, Mar. 22, 1996.
Patent Abstract of Japan 09-185714, Jul. 15, 1997.
Patent Abstract of Japan 08-272961, Oct. 18, 1996.
Patent Abstract of Japan 09-248291, Sep. 22, 1997.

* cited by examiner

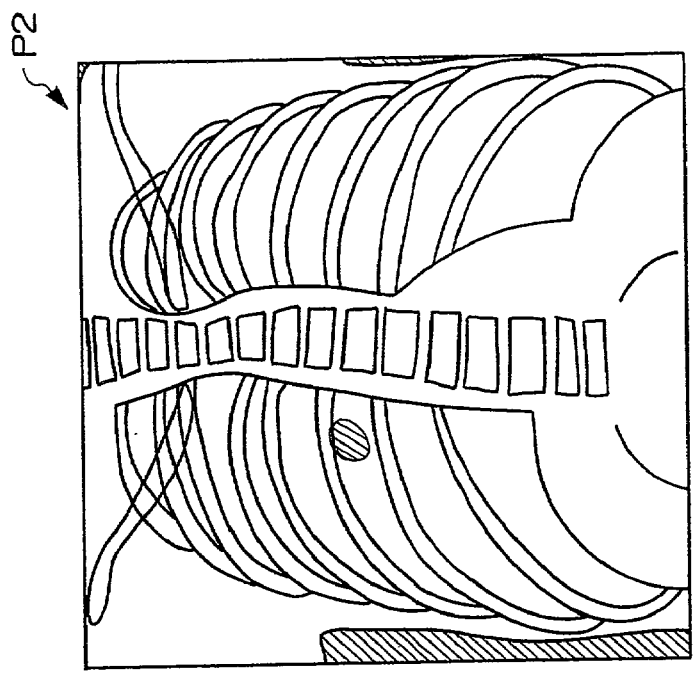
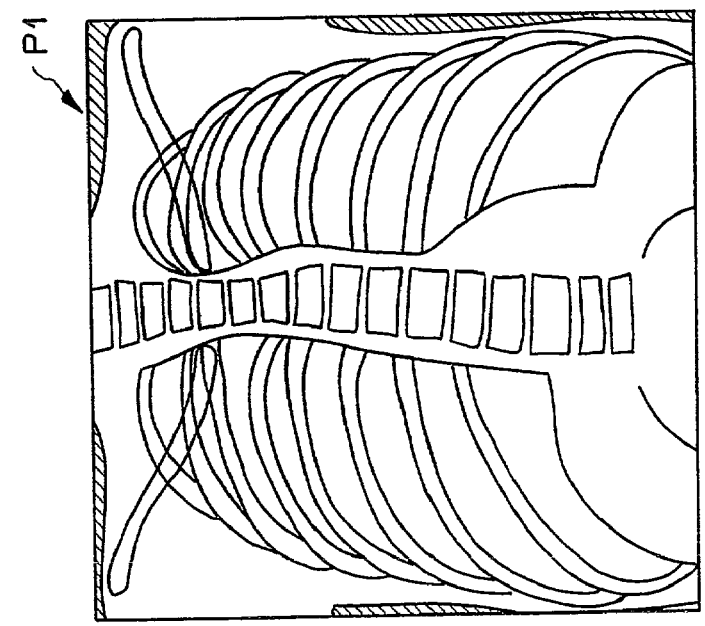

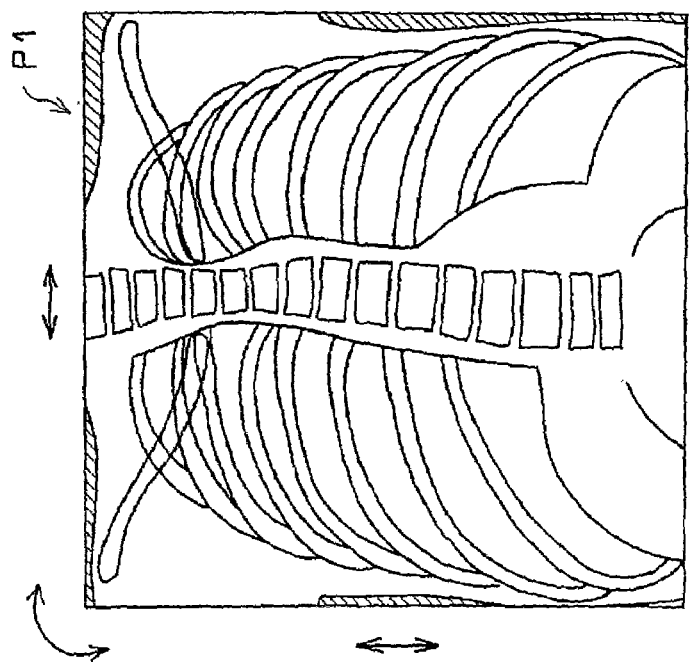
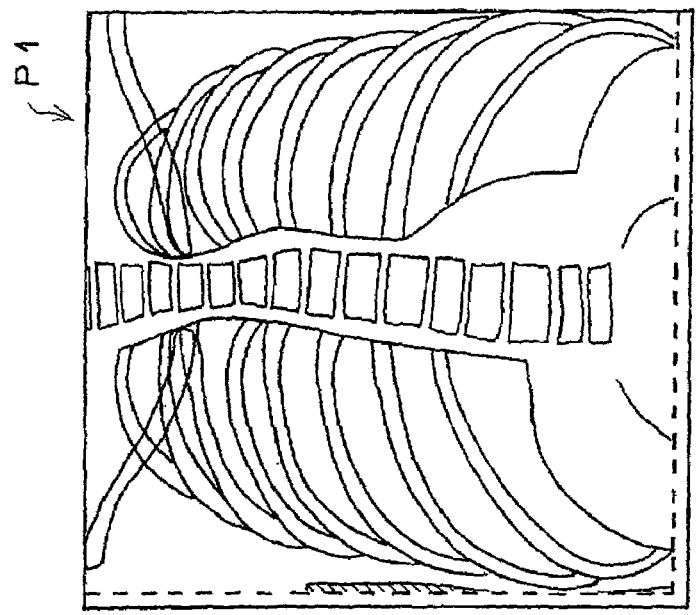
F I G. 3A
F I G. 3B

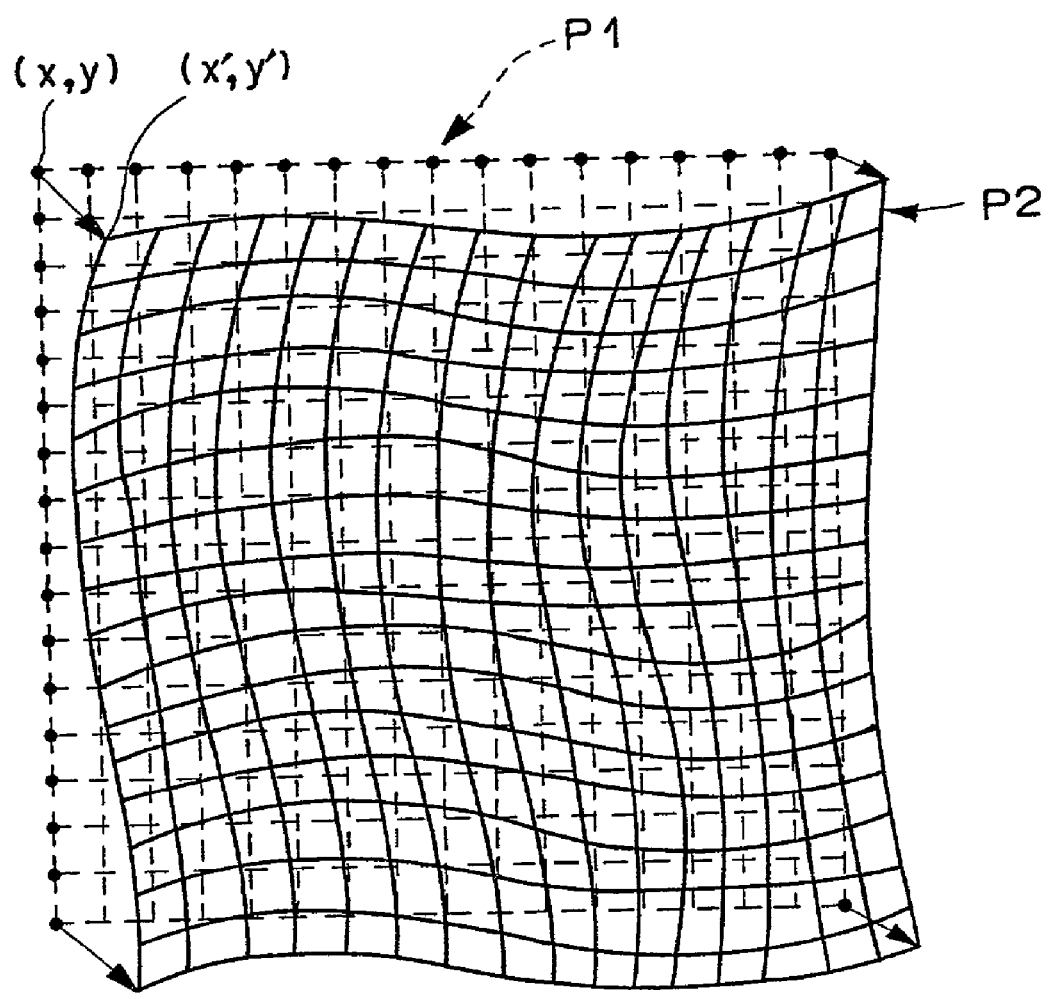

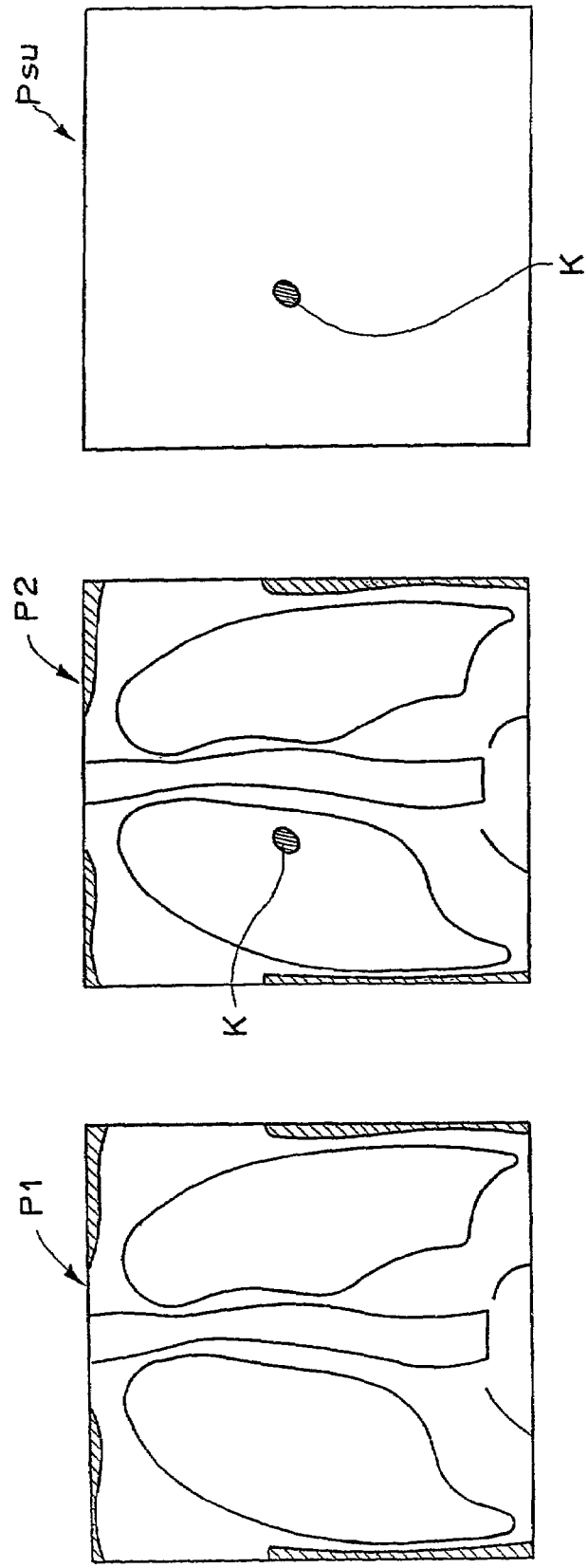

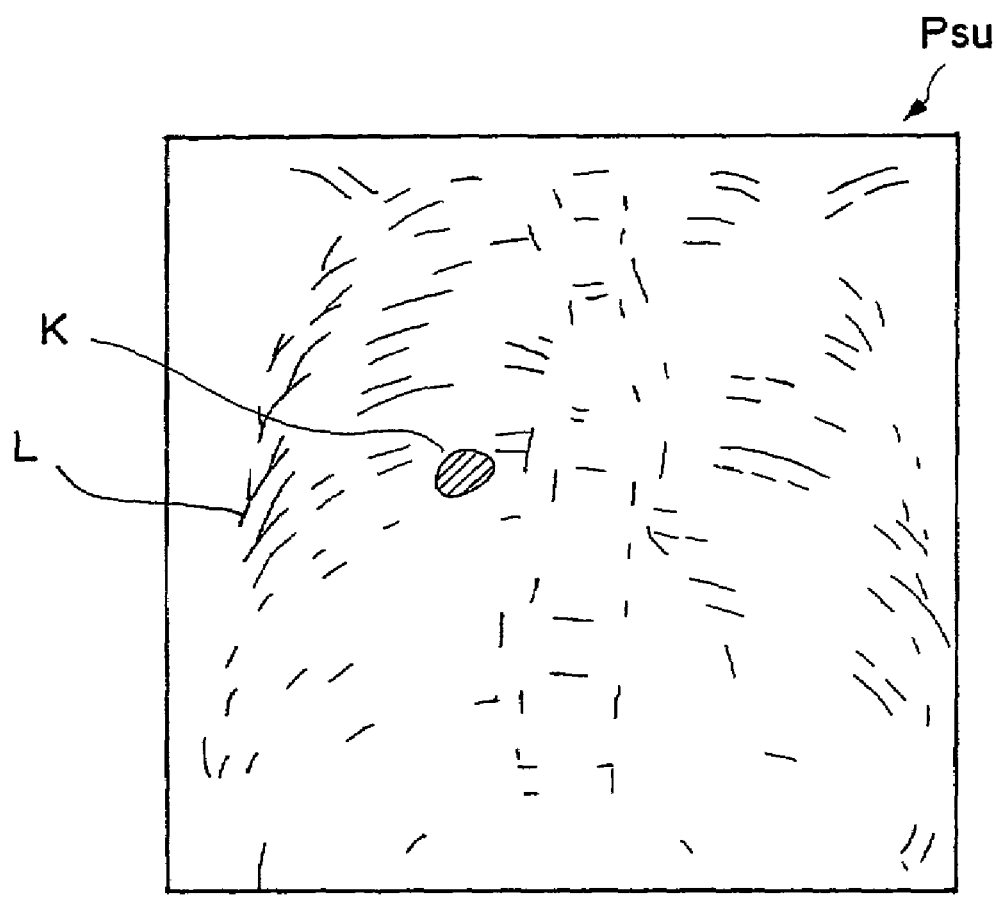

F I G .10
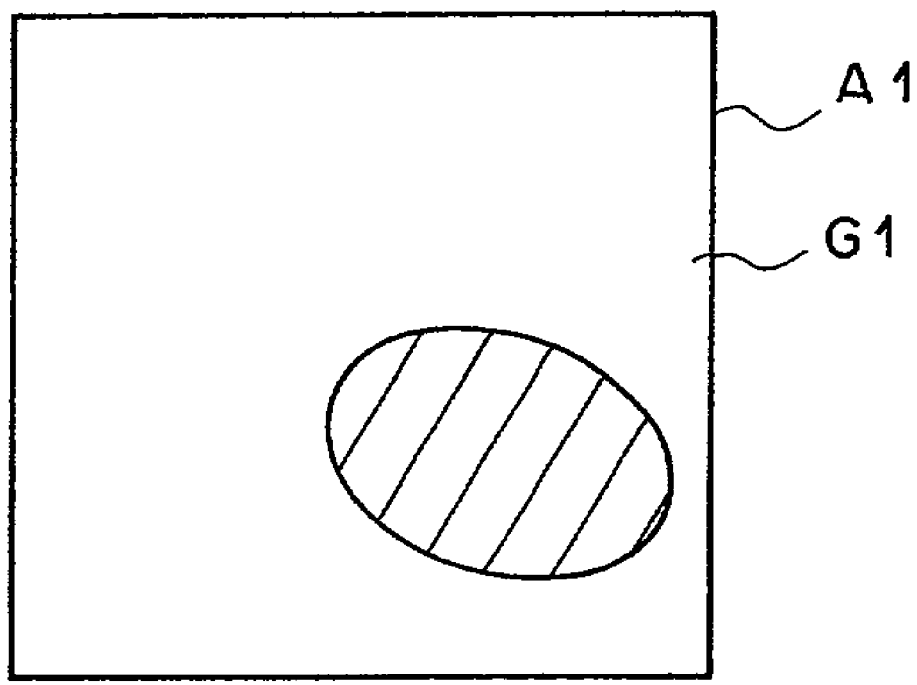

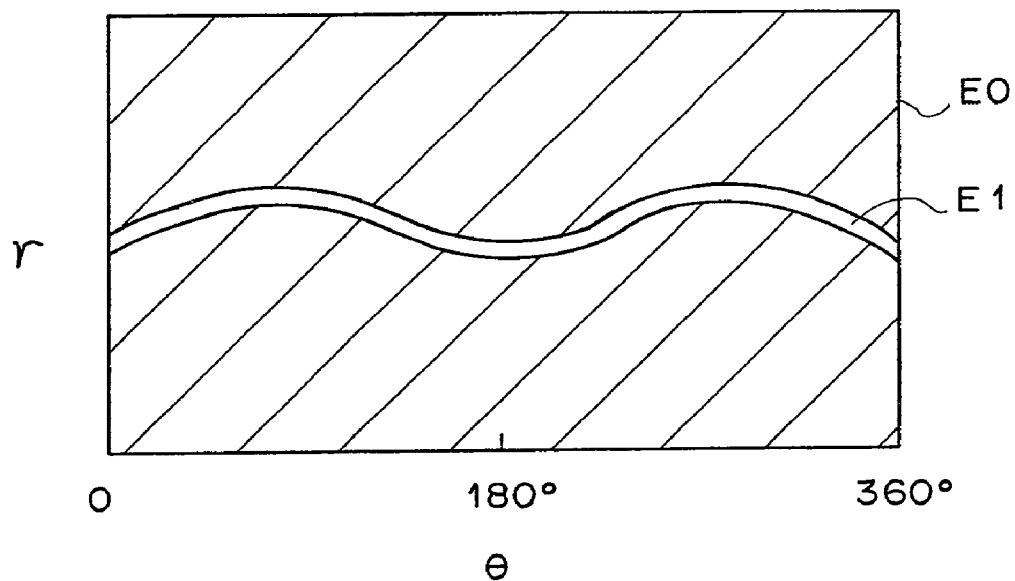
F I G . 14

F I G. 16A
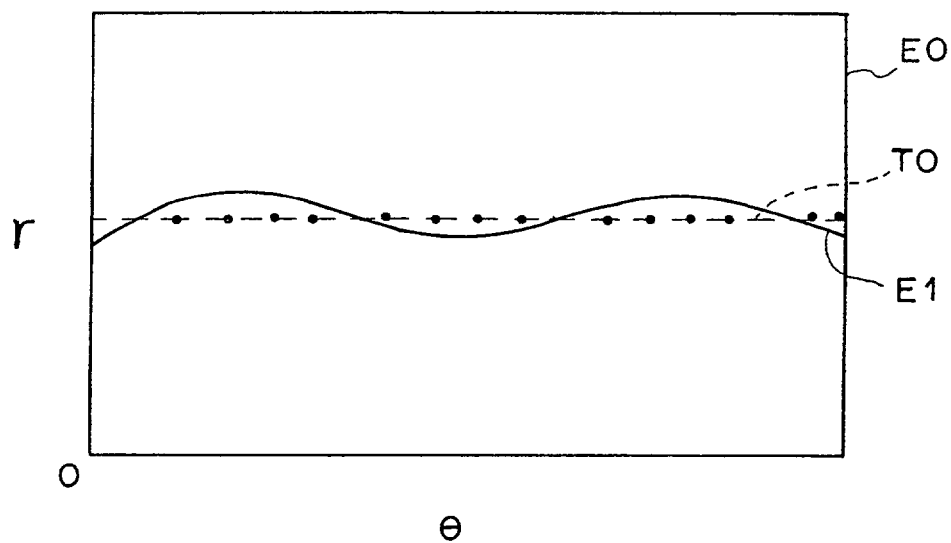
F I G. 16B
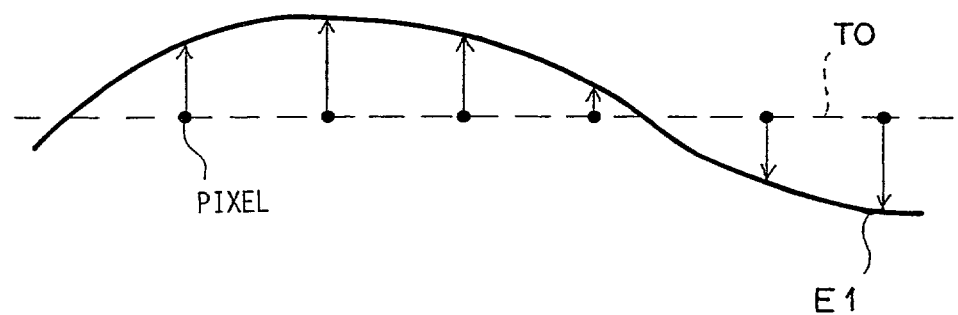

F I G . 17
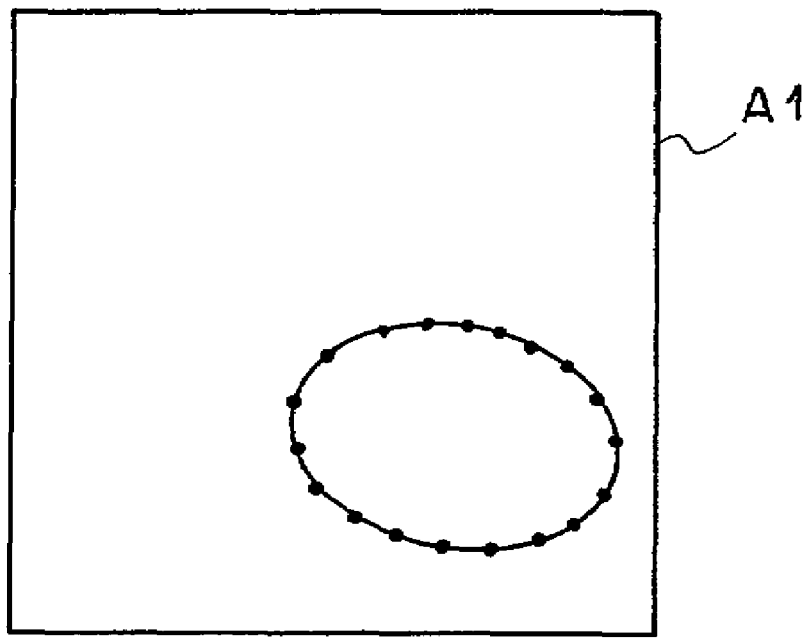

F I G. 19A
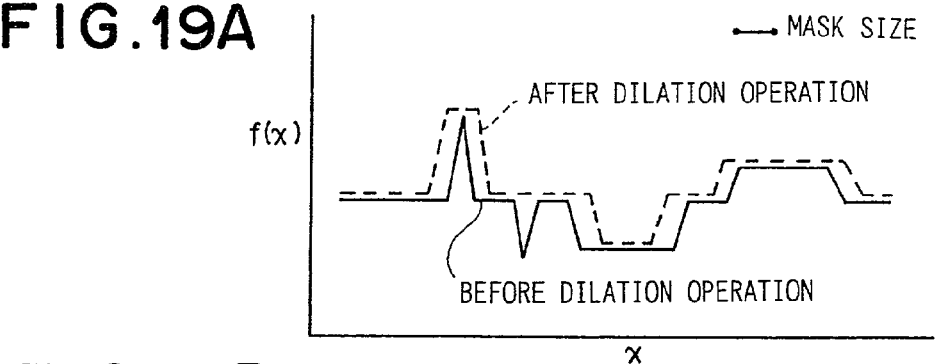
F I G. 19B
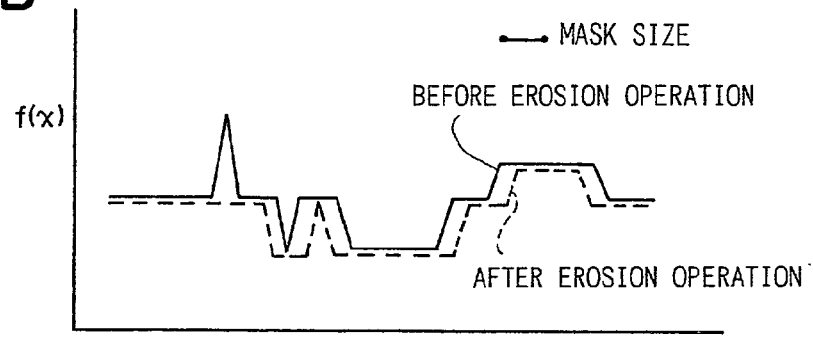
F I G. 19C
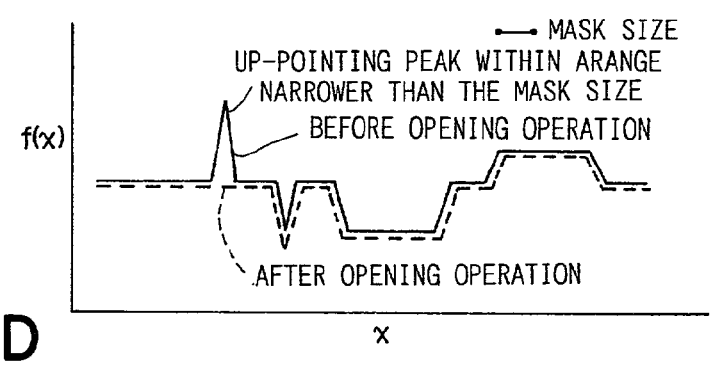
F I G. 19D
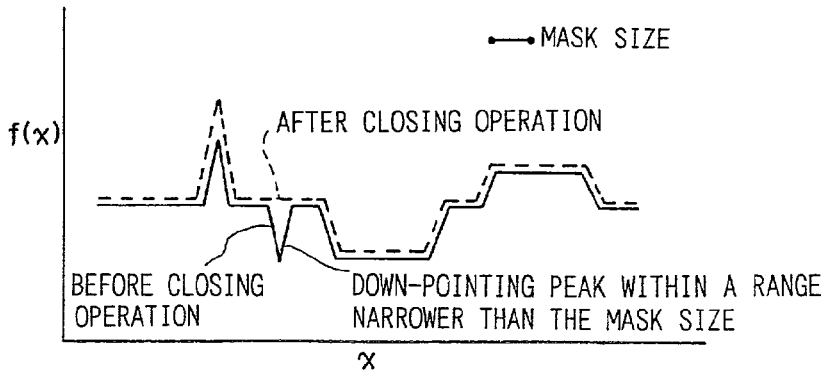

METHOD AND APPARATUS FOR DETECTING ANOMALOUS SHADOWS

BACKGROUND OF THE INVENTION

1. Field of the Invention

The present invention relates in general to a method and apparatus for detecting anomalous shadows, and in particular to a method and apparatus for detecting anomalous shadows from a difference image, which is a comparative image representing the difference between two radiation images.

2. Description of the Related Art

In a variety of fields, the comparative reading of two or more images of the same subject obtained at different photographing times to detect the difference between the aforementioned two or more images is performed, and an examination, etc., of the subject of photographing is performed based on the detected difference.

In the field of industrial product manufacturing, for example, an image obtained of a product in the new state is compared to an image of the same product that has been obtained after said product has been subjected to a durability test, and by focusing mainly on the area in which the largest difference between the two images appears, the portion thereof that should be improved to improve the durability of the product is determined. Further, in the field of medicine, by comparatively reading a plurality of radiation images, which have been obtained in a temporal series, of a diseased portion of a patient, a physician can discern the course of the disease and the effectiveness of the treatment can be discerned and determine the course of future treatment.

In this way, the comparative reading of two or more images obtained of the same subject is performed in a variety of fields on a daily basis, and in order to perform this comparative reading, there are cases for which these two or more images are outputted on an image display apparatus or the like. That is to say, the image is converted to luminosity and density signals, and then displayed on an image display apparatus or the like, or outputted by a printer to a film or other such medium.

For cases in which the two or more images that are the objects of comparative reading are to be displayed, etc., although the general practice is simply to display said images an operator performing a comparative reading thereof is the area showing the difference between said images. However, in a case in which, for example, two images that are to become the objects of comparative reading as described above are simply displayed next to each other, as the size of the difference between becomes smaller the detection thereof becomes more difficult; therefore, there is a demand for an improvement in the performance of comparative reading.

Therefore, interimage computational processes, starting with a subtraction process between the pixels corresponding to each of the respective two or more images that are the objects of comparative reading, is performed, and the difference therebetween is enhanced. Because it becomes possible to accurately render the difference between the images visually discernable, by enhancing only the difference between the images in this way, to an operator performing the comparative reading, it is possible to prevent the overlooking of the difference between the images, particularly in the medical field with respect to the course of a disease or a diseased portion requiring treatment. For example, on a difference image (a so-called temporal subtraction image) obtained by the above-described interimage processes and representing the difference between two chest x-ray images obtained in a temporal series, it is possible to display even small, early-stage lung tumors, which are substantially 100% treatable, and the extraordinary effectiveness for the use in diagnosis is widely acknowledged.

Further, a method wherein, by adding the above-described subtraction image to a temporal image, the change that has occurred in a diseased portion becomes easier to discern visually, has also been proposed (refer to Japanese unexamined Patent Publication No. 8(1996)-77329).

However, although the process of selecting the diseased portion on the difference image is performed visually and manually by an operator performing a comparative reading as required, the accuracy of said selection is dependent upon the experience level and ability of the operator, and it is not a foregone conclusion that said selection will always be an objectively viable selection. In a case, for example, in which the objective of radiation images that are to be the objects of comparative reading is the detection of lung tumors, it is necessary to extract the small, faint suspected anomalous shadows that are one indicator of cancerous growths; however, it is not guaranteed that those shadows will be accurately selected. Therefore, there is a demand for a method and apparatus capable of accurately detecting the anomalous shadows that is not dependent upon the skill level of the operator.

In order to respond to this demand, CADM (Computer Aided Diagnosis of Medical images), which has an objective of accurately and automatically detecting the suspected anomalous shadows by employing computational processes, has been advancing in recent years.

That is to say, CADM technology, by performing the detection of the above-described suspected anomalous shadows based on performing a detection process for detecting the density distribution and shape characteristics thereof utilizing a computer, is a technology that automatically detects the suspected anomalous shadows. A variety of CADM technologies for application to chest X-ray images and which provide for a high probability of detecting diseased portions such as lung tumors have been proposed (refer to, for example, Japanese Unexamined Patent Publication No. 9(1997)-185714).

Here, the method proposed in the aforementioned Japanese unexamined Patent Publication No. 9(1997)-185714 is a method for applying CADM technology to an original image and an energy subtraction image (that is, the difference image between a signal enhanced image and a signal suppressed image) for detecting suspected anomalous shadows. However, there is a possibility that the early-stage lung tumors in an original image or an energy subtraction image will be overlooked even by an experienced diagnostician; even by applying CADM technology, it has been nearly impossible to extract the suspected anomalous shadows of diseased portions such as early-stage lung tumors, which are easily overlooked.

Therefore, applying CADM technology to the above-described difference image has been considered. Here, when the above-described difference image is to be formed, although it is necessary to match the positions of two images, even if position matching is performed, slight misalignments occur at the outlines of the structuring elements (positional misalignments), and artifacts due to these positional misalignments appear in the difference image. In particular, if the subject of photographing is a living-tissue subject, the 3-dimensional misalignments due to fluctuations in the angle between the irradiation direction of the radiation and the body axis of the subject of photographing, the angle of entry of the radiation relative to the orientation of the subject of photographing, etc., that appear in a 2-dimensionally displayed image are exceedingly difficult to correct (position matching) therefore, artifacts remain in the difference image.

Essentially, because only the actual difference portion representing the change, etc. of the diseased portion appears if artifacts do not occur in a difference image, by detecting the image portion that appears in a difference image, the size, etc. of the position of the diseased portion can be efficiently determined. However, if artifacts appear in the difference image, the above-described actual difference between the images does not stand out within the difference image due to the presence of the artifacts, and even if CADM technology is applied, there is a fear that it will not be possible to detect the difference.

SUMMARY OF THE INVENTION

The present invention has been developed in view of the circumstances described above, and it is a primary object of the present invention to provide an anomalous shadow detecting method and apparatus capable of adequately detecting anomalous shadows within a difference image, even for cases in which there are artifacts present in the within the difference image.

According to the suspected anomalous shadow detecting method and apparatus of the present invention, by subjecting the difference image to an image process wherein the difference between the two images on which the difference image is based is enhanced relative to the artifacts, and the artifacts, which can have a negative effect on the diagnostic reading of the difference image, are reduced relative to the actual difference between the aforementioned two images, which is the area of interest in the image.

That is to say, the method of detecting suspected anomalous shadows according to the present invention comprises the steps of: obtaining a difference image representing the difference between two images, which have been obtained of the same subject at different photographing times, by subjecting said two images to an interimage process for obtaining the difference between said two images; obtaining a processed difference image by subjecting the obtained difference image to an image process wherein the actual difference between the two images is enhanced relative to the artifacts appearing due to misalignment of the positions of the structural elements thereof; and detecting the actual difference between the aforementioned two images from the processed difference image as suspected anomalous shadows.

Here, as to the aforementioned two or more images, radiation images that have been obtained of the same subject in a temporal series, each at a different time, and which become the objects of a comparison that is performed to determine the temporal change can be applied, and the present invention is particularly effective when the subject of photographing is a living body. Because each of the internal structural elements of a living body move in a 3-dimensional manner, the relative positions of the structural elements between two images is easily thrown off due to the occurrence of positional misalignments.

As to the interimage process, it is preferable that a subtraction process corresponding to the structural positions between the two images is applied. This is due to the fact that by representing the difference between the two images as the difference between image signals, it is simple to render the difference clearly. However, the interimage process is not limited to being a subtraction process; the application of a division process or the like corresponding to the positions of the structuring elements within two images cannot be ruled out. As to the subtraction process, a simple subtraction computation or a weighted subtraction computation can be employed. An interimage calculated image obtained by a subtraction process is generally referred to as a subtraction image. These subtraction images include: an energy subtraction image (simple subtraction or weighted subtraction) obtained based on two original images having mutually different energy distributions (the two original images: a high energy exposure image <a normal radiation-image>, and a low energy exposure image <a high-pressure suppressed image>) and which have been obtained at substantially the same time in terms of a temporal series; a temporal subtraction image obtained based on two original images obtained in a temporal series, each obtained at different times; and a DSA (Digital subtraction Angiography) obtained of images photographed of a blood vessel both before and after the injection of a dye; etc.

As to the image process for enhancing the actual difference between two images relative to the artifacts, an image process that enhances the actual difference more than the artifacts, or an image process that suppresses the artifacts more than the actual difference can be applied.

As to the image process for suppressing the artifacts relative to the actual difference between two images, it is preferable that a morphology process based on a morphology computation employing structuring elements that are larger than the artifacts or smaller than the actual difference is applied. This is due to the fact that the artifacts remaining in a difference image can be effectively suppressed with respect to the aforementioned actual difference. Note that the "morphology process" in general, has been developed as a set theory occurring in an N-dimensional space, and is often applied to images, which are 2-dimensional spaces (refer to Japanese Unexamined Patent Publication Nos. 8(1996)-272961, 9(1997)-248291, 9(1997)-91421, etc.). Here, a simple explanation of this morphology process will be given below, using a concentration image as an example.

A concentration image is regarded as a 3-dimensional space constituted of a certain number of points (x, y) having respective heights corresponding to a concentration value f (x, y); a 1-dimensional function f (x) can be considered appropriate for this area. As shown in formula (1), the structuring element g utilized in the morphology process is a symmetric function that is symmetrical about an origin point.

$$g^s(x) = g(-x) \tag{1}$$

The value is 0 at the defining area, and this defining area G is defined as shown in the following formula (2).

$$G = \{-m, -m+1, \ldots, -1, 0, 1, \ldots, m, -m\} \tag{2}$$

At this time, the basic form of the morphology process is as shown formulas (3)-(6), and is an extraordinarily simple computation.

$$\text{dilation; } \lfloor f \oplus G^\theta \rfloor(i) = \max\{f(i-m), \ldots, f(i), \ldots, f(i+m)\} \tag{3}$$

$$\text{erosion ; } [f \ominus G^\theta](i) = \min\{f(i-m), \ldots, f(i), \ldots, f(i+m)\} \tag{4}$$

$$\text{opening; } f_g = (f \ominus g^\theta) \oplus g \tag{5}$$

$$\text{closing; } f^g = (f \oplus g^\theta) \ominus g \tag{6}$$

That is to say, the dilation process is an operation that searches for the maximum value within the range of the width ±m (a value defined by the structuring element and equal to the mask size shown in FIG. 19A), which has the pixel of interest as the center pixel thereof, (refer to FIG. 19A). on the other hand, the erosion process is an operation that searches for the minimum value within the range of the width ±m, which has the pixel of interest as the center pixel thereof (refer to FIG. 19B). Further, the opening-process is an operation consisting of performing the erosion process followed by the dilation process; that is to say, an operation that searches for the minimum value first and then searches for the maximum value. on the other hand, the closing-process is an operation consisting of performing the dilation process followed by the erosion process; that is to say, an operation that searches for the maximum value first and then searches for the minimum value.

In other words, the opening-process smoothes the density-curve f(x) from the low-density side thereof, and is appropriate for controlling the up-pointing peaks of density fluctuation portions that fluctuate within the range spatially narrower than the mask, which has a size of 2 m (refer to FIG. 19C).

On the other hand, the closing-process smoothes the density-curve f(x) from the high-density side thereof, and is appropriate for controlling the down-pointing peaks of density fluctuation portions that fluctuate within the range spatially narrower than the mask, which has a size of 2 m (refer to FIG. 19D).

Here for cases in which a signal becomes a high-density high-signal level as the density value thereof increases, because the size relation with respect to the case in which the image signal value of the density value f(x) is a high-luminosity high-signal level is reversed, the dilation process for a high-density high-signal level signal and the erosion process for a high-luminosity high-signal level signal (refer to FIG. 19B) are identical, and the erosion process for a high-density high-signal level signal and the dilation process for a high-luminosity high-signal level signal (refer to FIG. 19A) are identical; the opening process for a high-density high-signal level signal and the closing process for a high-luminosity high-signal level signal (refer to FIG. 19D) are identical, and the closing process for a high-density high-signal level signal and the opening process for a high-luminosity high-signal level signal (refer to FIG. 19c) are identical.

Therefore, by subjecting an image signal representing an original image to an opening or closing morphology process in this manner, granularity (i.e., the noise occurring as an image signal) can be suppressed (or eliminated) (refer to, for example, "Morphology", by obata, corona Press). Note that for the sake of simplicity an explanation of a case in which a 1-dimensional mask (a structural element) has been employed in morphology processing of a 1-dimensional density distribution has been given, however, in applying a morphology process to an image extending 2-dimensionally, a plurality of 1-dimensional structuring elements can be set within the surface of the 2-dimensional image and the process can be performed a plurality of times, that is, once for each respective structural element, or a 2-dimensional structural element can be set, and the process can be performed once applying this 2-dimensional structural element.

Note that according to the anomalous shadow detecting method of the present invention, it is preferable that the substantially round-shaped differences from among the actual differences appearing in the processed difference image are detected as the suspected anomalous shadows.

The anomalous shadow detecting apparatus according to the present invention is an apparatus for implementing the anomalous shadow detecting method of the present invention, and comprises:

an interimage processing means for obtaining a difference image representing the difference between two images which have been obtained of the same subject at different photographing times, by subjecting said two images to an interimage process to obtain the difference between said two images;

an image processing means for obtaining a processed difference image by subjecting the aforementioned difference image to an image process wherein the actual difference between the two images on which the aforementioned difference image is based is enhanced relative to the artifacts appearing due to misalignment of the positions of the structural elements thereof; and a detecting means for detecting the actual difference between the aforementioned two images from the processed difference image as suspected anomalous shadows.

As to the aforementioned two or more images on which the difference image is based, implementing the present invention is more effective and advantageous if applied to radiation images that have been obtained of the same subject in a temporal series, each image being obtained at a different time, and which are to become the objects of comparison for determining the temporal change therebetween.

As to the interimage process, it is preferable that a subtraction process corresponding to the structural positions between the two images is applied.

As to the image processing means, a means for carrying out a process which suppresses the artifacts relative to the actual difference between two images, or conversely, a means for carrying out a process which enhances the actual difference between two images relative to the artifacts can be applied. For cases in which the image processing means is a means for carrying out a process which suppresses the artifacts relative to the actual difference between two images, it is preferable that a morphology process based on a morphology computation employing structuring elements that are larger than the artifacts or smaller than the actual difference is applied.

Note that as to the detecting means, it is preferable that a means for detecting the substantially round-shaped differences from among the actual differences appearing in the processed difference image as the suspected anomalous shadows is employed.

According to the method and apparatus for detecting anomalous shadow according to the present invention, by subjecting an interimage image to an image process wherein the actual difference between two images is enhanced relative to the artifacts appearing in the interimage image due to misalignment of the structural positions between said two images, the artifacts, which have a negative effect with regard to the detection of the suspected anomalous shadows can be reduced relative to the actual differences between the two images, which are regarded as the suspected anomalous shadows. Accordingly, the suspected anomalous shadows can be detected accurately, with no negative effect from the artifacts.

BRIEF DESCRIPTION OF THE DRAWINGS

FIGS. 2A and 2B illustrate two original images that are to be subjected to a temporal subtraction process by the interimage processing apparatus, FIGS. 3A and 3B are drawings illustrating global matching, FIG. 5 is a drawing illustrating a non-linear transform, FIGS. 6A, 6B, and 6C are drawings illustrating a first original image, a second original image and a subtraction image for a case in which the positions of the first and second images have been completely matched, FIG. 7 is a drawing illustrating an example of an actual subtraction image, FIG. 10 is a drawing illustrating the image within a selected small region, FIG. 14 is a drawing illustrating an edge image, FIGS. 16A and 16B are drawings illustrating template matching, FIG. 17 is a drawing illustrating the detection state of a small region, FIGS. 19A, 19B, 19C, and 19D are graphs each illustrating the concept of a morphology process.

DESCRIPTION OF THE PREFERRED EMBODIMENTS

Hereinafter, a preferred embodiment of the method and apparatus for detecting anomalous shadows according to the present invention will be explained with reference to the attached drawings.

Figure 1:
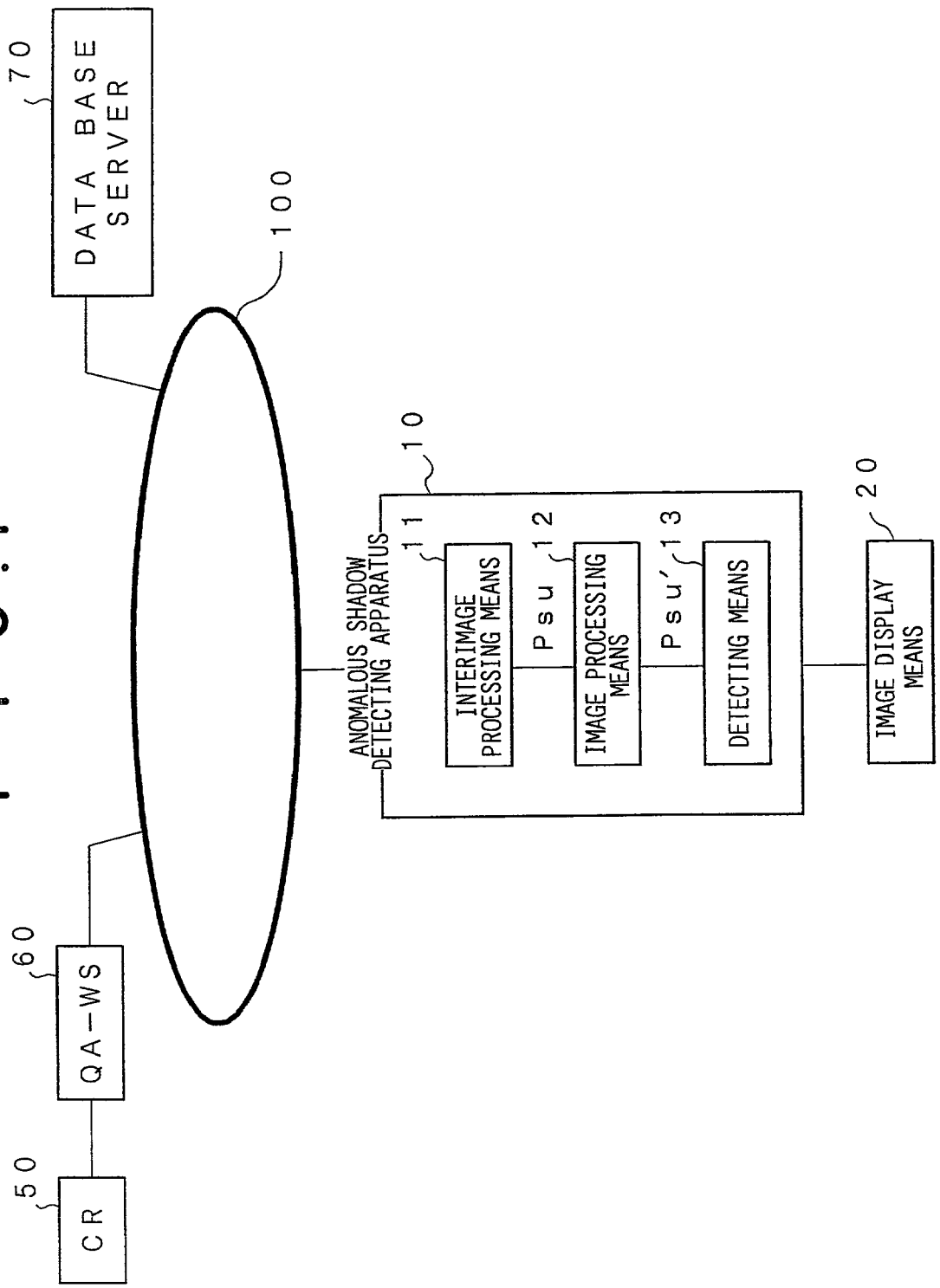
FIG. 1 is an overview drawing of the configuration of a network including an embodiment of the suspected anomalous shadow detecting apparatus according to the present invention.

FIG. 1 is a drawing of a medical image network 100 including an anomalous shadow detecting apparatus, which is an embodiment of the method and apparatus for detecting anomalous shadows according to the present invention.

Connected to the network 100 shown in FIG. 1 is an anomalous shadow detecting apparatus provided with, for example: a CT (Computer Tomography imaging) apparatus; an MRI (Magnetic Resonance Imaging) apparatus; a CR (computer Radiography) apparatus 50 or other medical image forming apparatus; a data base 70 for cumulatively storing each type of diagnostic medical image formed by these medical image forming apparatuses; an image display apparatus 20 for displaying images temporarily stored in the data base 70 or images that have been transmitted directly from the image forming apparatuses; an interimage processing means 11 for performing a temporal subtraction process, which is one example of an interimage process, based on two or more image data input thereto and obtaining a temporal subtraction image (an example of an interimage processed image, hereinafter referred to as a subtraction image Psu); and an image processing means 12 for subjecting the subtraction image Psu formed by the interimage processing means 11 to the process to be described below and; a detecting means 13 for detecting the suspected anomalous shadows from the temporal subtraction image that has been subjected to the image process (hereinafter referred to as a processed subtraction image Psu'). Note that a variety of other image outputting devices (not shown) such as a printer for outputting images to film or the like are connected to the network.

The CR apparatus 50 records the radiation image of a subject of photographing on a stimulable phosphor sheet having a layer containing stimulable phosphors by irradiating said stimulable phosphor sheet with the radiation energy that passes through said subject of photographing upon the irradiation thereof with a radiation, and then irradiates said stimulable phosphor sheet with a laser light or other excitation light and photoelectrically reads out the stimulated emission emitted thereupon as a quantity of light corresponding to the radiation energy that has been recorded on the phosphor sheet, whereby a radiation image of the radiation energy that has passed through the subject of photographing is obtained as a digital image; these CR apparatuses are widely used in hospitals and other medical facilities.

The QA-WS (a workstation for image quality control) 60 disposed between the CR apparatus 50 and the network 100 checks the quality of an image formed by the above-described CR apparatus 50 or other image forming means, and is a work station provided with a function for outputting a command to an image forming apparatus (the CR apparatus 50, etc.) to re-obtain an image, etc., as required. The QA-WS 60 employed in the current embodiment is a means provided for displaying an image P formed by the CR apparatus 50 before storing said image P in the data base 70, and checking the image qualities such as the image density, the contrast, etc., as well as the photographing environment.

The image display apparatus 20 is not simply a means for displaying as a visible image an image inputted thereto via the network 100; said image display apparatus 20 is also provided with a function to serve as an input terminal for inputting a command to perform a subtraction process on two or more images P obtained of the same subject in a temporal series, etc.

The interimage processing means 11, as described above, forms a subtraction image Psu, based on two or more chest x-ray images P1 and P2, each image having been obtained of the same subject at a different point in time in a temporal series and which have been inputted thereto from the database 70, which represents the difference between these two images P1 and P2; the forming of this subtraction image Psu is carried out by first globally matching between the images P1 and P2 the structural elements (the sternum, the thorax, the lungs, the heart and other organs, etc.) appearing within each of images P1 and P2, and then dividing the images to obtain a plurality of small local regions and performing local matching so as to correlate the positions of each of said local regions. Then a subtraction process corresponding to the thus correlated pixels is performed between the two images obtained by this 2-step matching process. Note that the particulars of each position matching process are described below.

The content of the image process that the image processing means 12 performs on the subtraction image Psu formed by the interimage processing means 11 consists of subjecting the artifacts L, which are caused by misalignments between the correlative positions of the structuring elements of the image P1 and P2, appearing within the subtraction image Psu, which represents the difference between the images P1 and P2, to an image process that suppresses said artifacts L relative to the actual difference K, which is the portion between the two images P1 and P2 in which the density and the outline of the forms differ not because of a misalignment between positions, but due to the presence of a shadow of a tumor or diseased portion in only one of the two images P1 and P2, or due to the temporal change in a diseased portion due to the treatment thereof or the progression thereof (herein, after referred to simply as a diseased portion) appearing in both images.

More specifically, because there are numerous cases in which the artifacts L appearing in a subtraction image Psu are characterized in that said artifacts L have an elongated shape and are located along the outlines of the structural elements, although the diseased portion K, which is the actual difference between the two images P1 and P2, fluctuates in size corresponding to the course of the disease, the diseased portion(s) K can be recognized as the region(s) of a shape having a width which expands into a more substantially round or rectangular shape, etc., than that of the elongated shape of the artifacts L. Accordingly, by applying a morphology process utilizing a structuring element that is smaller than the diseased portion K and has a width (the length in the direction substantially perpendicular to the lengthwise direction of the artifacts L) larger than that of the artifacts L (such as a round structuring element having a diameter of said size, or a rectangular structuring element having aside of said size, etc.) as the aforementioned image process to which the subtraction image Psu is to be subjected, a diseased portion K of a size larger than that of the structuring element can be caused to remain, while the artifacts L of a length shorter than the length thereof in any direction can be eliminated.

Note that for cases in which a morphology process is applied to a subtraction image Psu, which is a concentration image, the subtraction image Psu is separated into a high-density image Psu1 formed of the portions of the image having a density equal to or higher than the base density (the density of the portions of the images P1 and P2 of which the difference between the respective densities thereof is 0) (the entire image Psu1 is formed of said image portions having a density equal to or greater than the base density, and the low-density portions, which have been converted to the base density), and a low-density image Psu2 formed of the portions of the subtraction image Psu having a density equal to or less than the base density (the entire image PSU2 is formed of said image portions having a density equal to or less than the base density, and the high-density portions, which have been converted to the base density); each of the high-density image Psu1 and the low-density image Psu2 are subjected to the above-described morphology process, and because it is preferable that the two images obtained thereby are subjected to an addition process (in which the images are weighted at a ratio of 0.5 to 0.5), hereinafter, the current embodiment will be explained in terms of said addition process.

The detecting means 13 detects the diseased portion K from the processed subtraction image Psu', in which the artifacts L have been suppressed, as an anomalous shadow(s). More specifically, the diseased portion(s) K is detected as an anomalous shadow(s) by use of a template matching method utilizing a template having the shape of the diseased portion K (substantially round or substantially rectangular): refer to Japanese unexamined Patent Publication No. 9(1997)-185714, in which a method for detecting the diseased portion K as the anomalous shadow(s) by use of a neural network is disclosed.

Next, the operation of the suspected anomalous shadow detecting apparatus according to the current embodiment will be explained.

A series of chest x-ray images P1, P2, . . . , Pn, each image having been obtained at a different point in time, of a specific patient that have been obtained in advance by the CR apparatus 50 is subjected to an image quality check by the QA-WS 60, and then output to the data base 70 and cumulatively stored therein.

First, an example in which a command to display a subtraction image Psu based on an image P1 (the first image), which is the image within a temporal series of images obtained of the same subject that has been obtained at the earliest point in time of said temporal series, and an image P2 (the second image), which is an image that has been obtained at a point in time later than that of said image P1, has been issued via the image display apparatus 20, which also serves as an input terminal for inputting commands, will be described.

The command inputted to the image display apparatus 20 is inputted to the data base 70 via the network 100. The data base 70 inputs, according to the command received from the image display means 20, the first image P1 and the second image P2 to the interimage processing means 11 via the network 100.

Figure 4B:
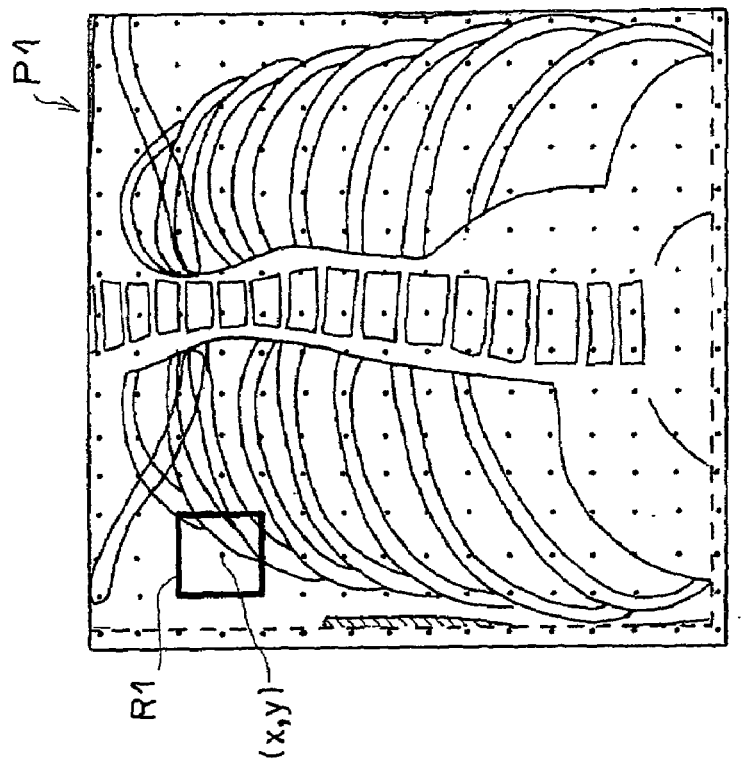
FIGS. 4A and 4B are drawings illustrating local matching.
Figure 4A:
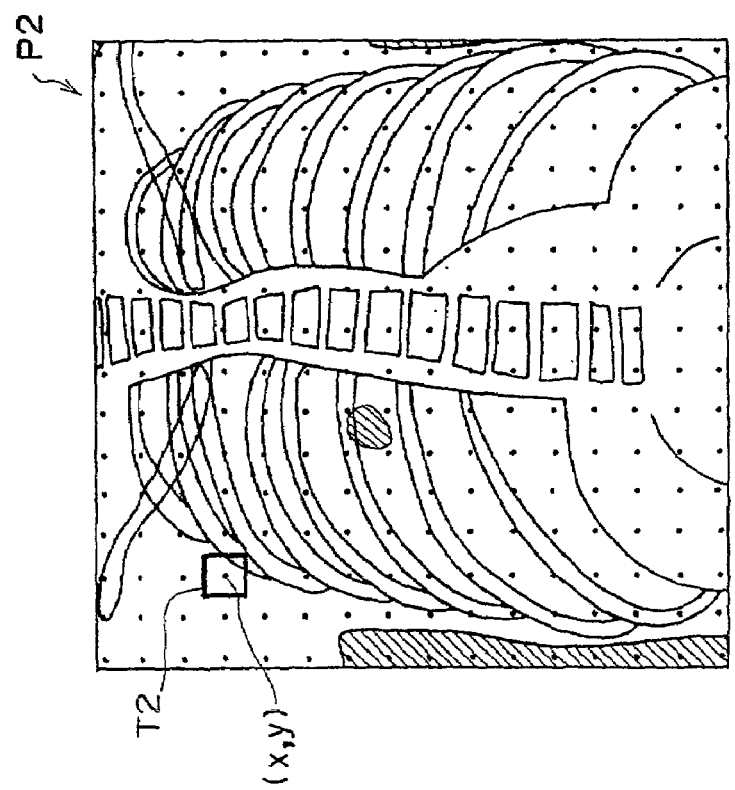

The interimage processing means 11 first performs global matching between the positions of the structural elements appearing in the images P1 and P2, and then divides said images P1 and P2 into a plurality of small local regions and performs local matching so as to correlate the positions of each of said local regions. That is to say, taking the image P2 as the base image from between the images P1 and P2 shown in FIGS. 2A and 2B, respectively, the first image P1 is subjected to an affine transform, and is globally matched to the newer image from among the temporal series, P2 (the second image), (refer to FIGS. 3A, 3B). continuing, the second image P2 from among both the images P1 and P2 that have been globally matched is subjected to a process employing a template and is divided thereby into a plurality of virtual small rectangular template regions T2. Then, the first image P1 is correlated to each of the template regions T2 of the second image P2, a search region R1 larger than each template region T2 is set, and for each search region R1, a corresponding and substantially matching template region T2 of the second image P2 is obtained (refer to FIGS. 4A and 4B); based on the corresponding positional relation between each template region T2 of the second image P2 and each corresponding template region of the first image P1, after each corresponding template region of the first image P1 has been globally matched to each respective template region T2 of the second image P2 so as to be substantially matched, the entire first image P1 is subjected as a whole to a non-linear transform (refer to FIGS. 5A and 5B), and the positions of the two images P1 and P2 are again matched.

Further, the interimage processing means 11 correlates the pixels of the base image P2 and the first image P1 that has been subjected to the transform of the above-described 2-step position matching process, and subtracts said first image P1 from said second image P2 to obtain a subtraction image Psu.

Here, for a case in which the above-described position matching is fully completed, the subtraction image Psu represents only the diseased portion K, which is not present in the first image P1 and is only actually present in the second image P2 and which is the actual difference between the images P1 and P2, as shown in the first image P1 (FIG. 6A), the second image 2 (FIG. 6B), and the subtraction image Psu (FIG. 6C). However, it is difficult to obtain an actual perfect matching of the positions, so in actuality, not only the diseased portion, which is the actual difference between the images P1 and the image P2, appears in the subtraction image Psu, but also artifacts L caused by misalignment between the outlines of structural elements such as bone tissue appearing in the two images P1 and P2 remain therein (refer to FIG. 7).

At this point, the image processing means 12 of the anomalous shadow detecting apparatus 10 according to the current embodiment performs an image process that suppresses the artifacts 1 in relation to the diseased portion K on the subtraction image Psu. More specifically, first, the subtraction image Psu (FIG. 8A) is separated into a high-density image Psu1 formed of the portions of the image having a density equal to or higher than the base density (the entire image Psu1 is formed of said image portions having a density equal to or greater than the base density, and the low-density portions, which have been converted to the base density), and a low-density image Psu2 (FIG. 8B) formed of the portions of the subtraction image Psu having a density equal to or less than the base density (the entire image PSU2 is formed of said image portions having a density equal to or less than the base density, and the high-density portions, which have been converted to the based density). Continuing, the high-density image Psu1 is subjected to a morphology process (an opening process) employing a structuring element (round-shaped) of a predetermined size, (FIG. 8C). on the other hand, the low-density image Psu2 is subjected to a morphology process (a closing process) employing a structuring element (round-shaped) of a predetermined size. Here, as described above, the size of the structuring elements employed in the morphology process are of a size that is smaller than the diseased portion K and larger than the width of the elongated artifacts L. The actual structuring elements to be employed are set based on the clinical data that has been gathered in advance for each case; in a case, for example, in which the size of a subtraction image Psu is 1780×1780 pixels, an element would be, for example, a round-shaped structuring element having a diameter of 4-5 pixels would be suitable. However, the size and shape of this structuring element can be changed according to the size and shape of the diseased portion that is to be extracted or the size and shape of the artifacts that are to be eliminated.

Because the opening-process from among the aforementioned several types of morphology processes is an operation consisting of eliminating the high-density image portions among the image portions smaller in size than the structuring element, aside from the diseased portion K, which is larger than the structuring element, the artifacts L1 (i.e., the artifacts having a high-density from among the artifacts L) that are smaller in size than the structuring element are substantially eliminated. In the same manner, the closing-process from among the aforementioned several types of morphology processes is an operation consisting of eliminating the low-density image portions among the image portions smaller in size than the structuring element, aside from the diseased portion K, which is larger than the structuring element, the artifacts L2 (i.e., the artifacts having a low-density from among the artifacts L) that are smaller in size than the structuring element are substantially eliminated (FIG. 8C).

Figure 8:
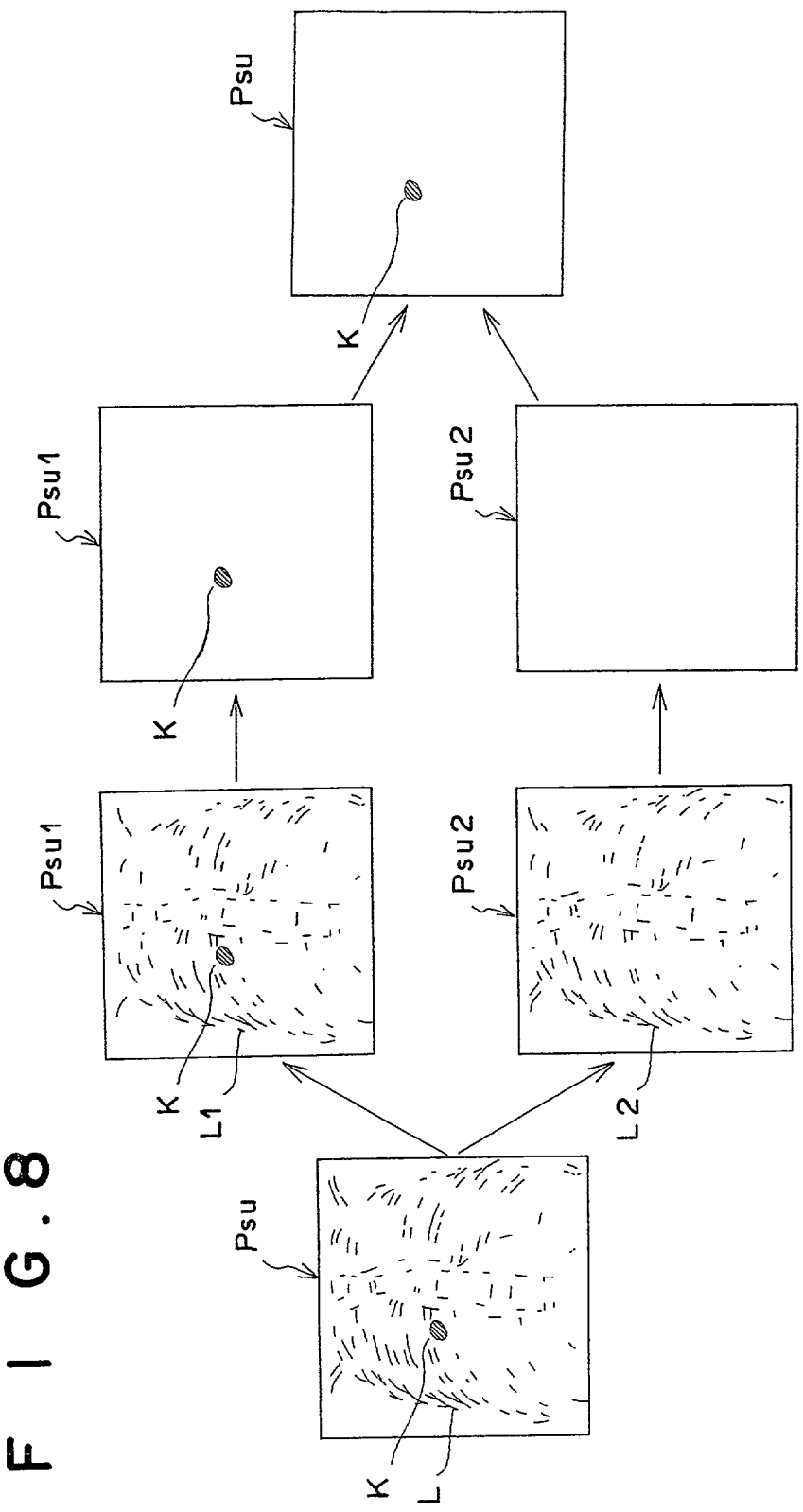
FIG. 8 is a drawing illustrating a temporal series according to the present invention.

The pixels of the subtraction image Psu1 and the subtraction image Psu2 obtained in this manner are again correlated, and both of said images are weighted at a 0.5:0.5 ratio and subjected to an addition process to again form a processed combined subtraction image Psu' (FIG. 8D).

Because the processed subtraction image Psu' formed again in this manner is an image in which the artifacts L, which are caused by misalignments of the corresponding structural positions between the image P1 and the image P2, have been suppressed (eliminated) relative to the diseased portion K, which is the actual difference between the image P1 and the image P2, the degree to which the artifacts appearing in a subtraction image interfere with the diagnostic reading thereof is reduced compared to currently available apparatuses.

Because the artifacts 1 have been suppressed in this processed subtraction image Psu', there is no hindrance to the diagnostic reading of the diseased portion K, and the diagnostic readability is improved in comparison to currently available methods and apparatuses. According to the current embodiment, the diseased portion K is again detected from this processed subtraction image Psu' as an anomalous shadow by the detecting means 13. Hereinafter, the process performed by the detecting means 13 will be explained.

Figure 9:
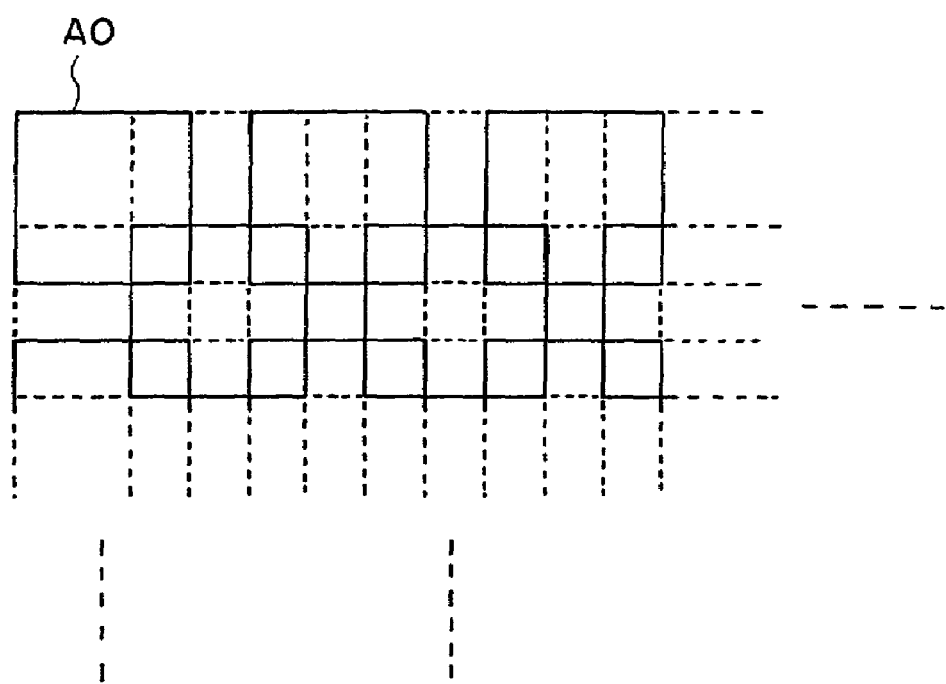
FIG. 9 is a drawing illustrating the division of a subtraction image into small regions.

First, the processed subtraction image Psu' is divided into a plurality of small regions. At this time, the processed subtraction image Psu' is divided so that a portion of each small region A0 overlaps, as shown in FIG. 9. The reason a portion of each small region A0 has been caused to overlap is to prevent failure in the detecting of the anomalous shadow for cases in which the anomalous shadow, that is, the diseased portion is located at a border of any of said small regions A0. Note that in FIG. 9, in order to clearly show the state in which each small region A0 overlaps, solid-line regions and broken-line regions are shown alternately. According to the current embodiment, the small regions A0 have a size of 32×32 pixels. Here, in the early stages of lung cancer, the diseased portions thereof have a size in the 3-10 mm range. Because the size of the small regions A0 is 32×32 pixels according to the current embodiment, in order to detect the smallest diseased portion K, which has a size in the 3 mm range, the overlap of the small regions A0 is caused to be 3 mm (for a case in which the size of one pixel is 0.2 mm: 15 pixels).

Next, the number of pixels cn, which is the number of pixels having a pixel value above a threshold value Th1 occurring within a small region A0, is counted, and the dispersion value a of the pixel value within a small region A0 is added thereto. Then, for cases in which the ratio (%) of the number of pixels cn of the small region A0 exceeds a predetermined threshold value Th2 and the dispersion value σ exceeds a threshold value Th3, that small region A0 is selected as a small region A1 in which there is a high probability that an anomalous shadow is located therein.

Here, if the pixel value is above the threshold value Th1, that pixel can be considered to represent an anomalous shadow; also, if said number of pixels cn is found to be above a certain percentage of the total number of pixels within the small region A0, there is a high probability that said pixels cn represents a suspected anomalous shadow. Further, for cases in which a small region A0 is a so-called beta image, which has a uniform pixel value and appears not to contain an anomalous shadow, the dispersion value a of the pixel value becomes a small value because said small region A0 contains only noise. Therefore, there is a high probability that a small region A0 for which the dispersion value a does not reach the threshold value 3 is a beta image formed only of noise. Accordingly, a small region A0 for which the number of pixels cn is above the threshold value Th2 and the dispersion value a is above the threshold value Th3 has been selected as a small region A1 of which there is a high probability that an anomalous shadow is contained therein.

Here, because the processed subtraction image Psu' according to the current embodiment is an image in which the artifacts L have been suppressed, the accuracy with which a small region A1, which has a high probability of containing an anomalous shadow, can be detected is improved.

Figure 11:
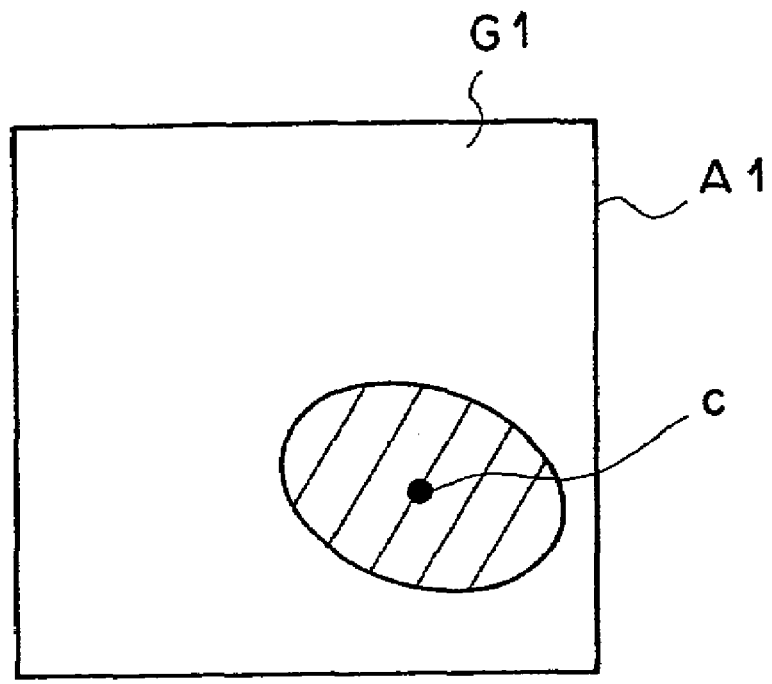
FIG. 11 is a drawing illustrating the image within a selected small region in the state in which the center has been set.
Figure 12:
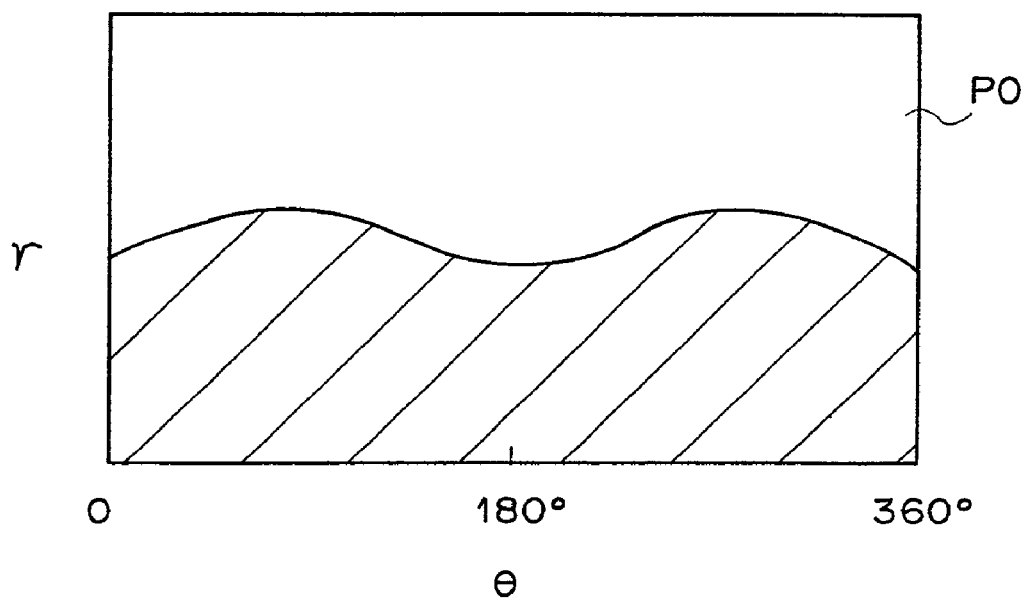
FIG. 12 is a drawing illustrating a coordinate image of selected small region.

In this way, when a small region A1 has been selected, a determination is made as to whether or not a small round region exists therein. This determination is made as follows. First, a center point c within the small region A0 is obtained using only the pixels of which the pixel value is above the threshold value Th1. Note that FIG. 10 shows an image G1 formed of only the pixels within the small region A0 whose pixel value exceeds the threshold value Th1. In this type of image, the center point c can be obtained as shown in FIG. 11.

Next, taking the center point c as the center, the image G1 of the small region A0 is converted to an extremes coordinate image. That is to say, the image G1 of the small region A0 is converted to an extremes coordinate image P0 representing the distance r from the center point c and the angle θ formed by the downward pointing vector passing through the center point c.

Figure 13:
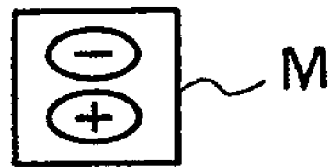
FIG. 13 is a drawing illustrating an edge detection mask.

Then, the edge portion extending in a horizontal direction, that is, in the direction of the angle θ is detected from the extremes coordinate image P0, and an edge image E0 is formed. This edge image E0 is formed by performing a convolution, by use of an edge mask M (FIG. 13) for detecting the horizontal edge portion, on the extremes coordinate image P0. An edge image E0 is shown in FIG. 14. AS shown in FIG. 14, the edge image E0 has the pixel value of the pixels of edge portion E1 occurring within the extremes coordinate image P0, which is a pixel value of 0 (highest brightness); the pixel value of the other portions thereof have the largest pixel value (least brightness).

Here, in order to improve the responsiveness of the edge detecting mask M to the straight line in the horizontal direction of the extremes coordinate image, the positive (+) portion of the mask is formed as an elongated elliptical shape so as to conform to the horizontal direction, and is selected so that the negative portion thereof is distributed on the upper side of the positive portion. In order to provide the mask with adequate orientational selectivity, a negative portion of this sort is indispensable. Then, the extremes coordinate image PO is subjected to a convolution using this mask, and an edge image E0 is formed.

Figure 15:
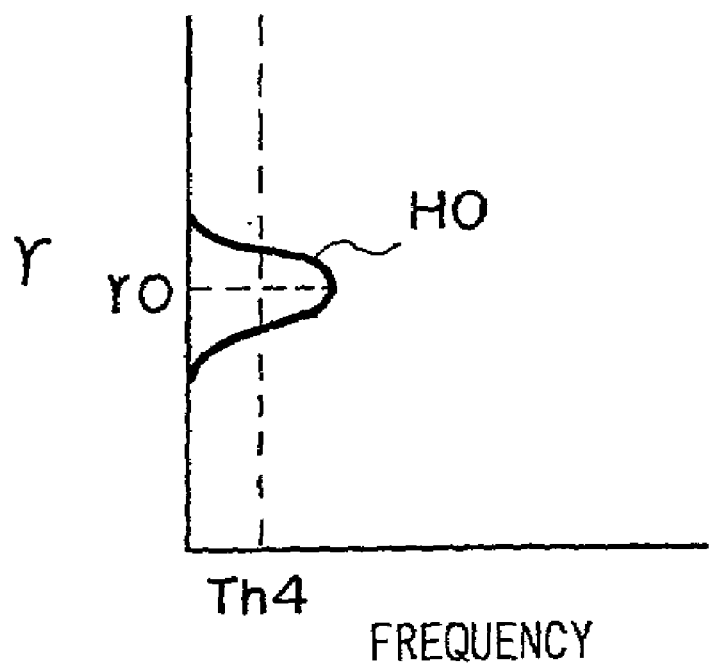
FIG. 15 is a drawing illustrating the histogram of an edge portion occurring in an edge image.

When an edge image E0 has been formed in this way, a histogram H0 is formed in the vertical direction of the edge portion E1 occurring in the edge image E0, that is, in the direction r. As shown in FIG. 15, this histogram H0 represents the distribution of the edge corresponding to the area from the center point c to the distance r. Therefore, as the edge is closer in shape to a perfect circle, it becomes distributed equidistant from the center point c, whereby the highest frequency of the histogram becomes large within said uniform distance. Accordingly, for cases in which the frequency of the histogram H0 is higher than a threshold value Th4, it is determined that a substantially round region is present within the selected small region A1.

Next, the small substantially round region is detected. This detection is performed by matching subjecting the edge image E0 to template matching by an elasticity template T0, which has as its initial position the base template obtained by subjecting the round region formed of the concentration of points around a point 0, which is the highest frequency of the histogram H0 at the radius r to extreme coordinate conversion.

When this template matching is performed, all of the pixels forming the elasticity template T0 do not move as a unit; the template T0 is a template that can receive the constraining of a virtual spring, wherein each pixel is constrained by the constraining power corresponding to the movement amount of each pixel in the interval between each said pixel and the pixels adjacent thereto, while being set so as to be capable of moving independently in the direction r, and the template is formed so that the entire template might be subjected to an elastic transform. Note that the base template is the straight line extending in the horizontal direction occurring at the highest frequency of the histogram H0.

First, as shown in FIGS. 16A and 16B, as to the initial position (the shape not having an elasticity transform) of the base template, the elasticity template T0 is disposed above the edge image E0 (FIG. 16A), and each of the pixels forming this elasticity template T0 is made independent and moved in the direction r (the north-south direction occurring within the extremes coordinate image). At this time, the movement amount of each pixel of the elasticity template T' at this time is obtained as follows. First, for the peripheral range of each pixel (initial position ±r), the difference between each pixel value p (nri±r, θi) and the pixel value p at the initial position (nri, nθi). Here, the pixel value of the position at which the value of r is small is subtracted from the pixel value of the position at which the value of r is large. Then, the sum of this difference is obtained according to the formula (7) below:

Sum difference of pixel values=

$$\sum_{r}^{N1} \psi\left[\frac{\{g(nri+r, n\theta i) - g(nri, n\theta i)\}}{r}\right] + \sum_{r}^{N2} \psi\left[\frac{\{g(nri, n\theta i) - g(nri-r, n\theta i)\}}{r}\right] \quad (7)$$

where N1 is a range having a larger r than the initial value among the peripheral ranges, and N2 is a range having a smaller r than the initial value among the peripheral ranges:

$$\psi(x) = \begin{cases} x & (x \geq 0) \\ 0 & (x < 0) \end{cases}$$

This sum difference of the pixel values shows that a positive value is obtained if there are bright pixels (high pixel value, low density) in the direction having a value r larger than that of the initial position, and that a negative value is obtained if there if there are bright pixels (high pixel value, low density) in the direction having a value r smaller than that of the initial position. Further, by dividing the difference of the pixel values by r, the difference of the pixels in the vicinity of the initial position is weighted. That is to say, because the edge portion E1 is brighter than the periphery thereof, if the edge portion E1 is located in a direction having an r larger than the initial position, a positive value is obtained for the sum difference of the pixel values, and if the edge portion E1 is located in a direction having an r smaller than the initial position, a negative value is obtained for the sum difference of the pixel values; this positive or negative symbol provides an indication of the orientation of the movement from the initial position, and an indication of the movement amount is provided by the absolute value thereof.

At that point, the r of the movement amount (including the orientation) of each pixel of the elasticity template T0 is defined by the formula (8) below, which utilizes a predetermined coefficient b:

$$r = \sum_{r}^{N1} \psi\left[\frac{\{g(nri+r, n\theta i) - g(nri, n\theta i)\}}{r}\right] \cdot b + \sum_{r}^{N2} \psi\left[\frac{\{g(nri, n\theta i) - g(nri-r, n\theta i)\}}{r}\right] \cdot b \quad (8)$$

Although the movement amount rn obtained for each pixel in this manner, as shown in FIG. 16B, is the movement amount of each independently moved pixel, as described above, because this elasticity template T0 is a template by which each pixel forming the image is constrained by the peripheral pixels of said elasticity template T0, the pixels are not moved the exact amount of the aforementioned movement amount rn, but are moved as determined according to each movement amount rk (k=n, n±1, . . . ) of the adjacent pixels (for example, both of the adjacent pixels: pixel n−1; pixel n+1), and also the pixels included up to said adjacent pixels (pixel n−2; pixel n−1; pixel n+1; pixel n+2; etc.), as shown in the Formula (9) below:

$$r_n = \Sigma(a_k \cdot r_k) \quad (9)$$

Here, it is preferable that the spring constant ak is set so as to be large with regard to the pixel of interest n and small with regard to the peripheral pixels n±1, . . . . That is to say, because the spring constant is defined as:

$$a_n > a_{n\pm 1} > a_{n\pm 2} > \ldots > a_{n\pm m} \quad (10)$$

in formula (9), the movement amount rn of the pixel of interest n becomes the movement amount corresponding to the difference between the movement amount rn thereof and the movement amount rk of the pixels adjacent thereto, and is constrained by the virtual elasticity.

By repeating the operation of moving each pixel of the elasticity template T0 a little at a time as described above, the edge portion E1 can be detected with accuracy. Note that the determination as to when the repetition of the operation is to be terminated is based on the sum difference of the movement amount having fallen below a predetermined threshold value, or the number of repetitions having reached a predetermined number of times.

According to the process described above, a substantially round region is detected with a high degree of accuracy by the pixels forming the elasticity template T0, and finally, the pixels forming the elasticity template T0 are returned to the actual image, the area between adjacent pixels is subjected to a correction process (a linear correction, a spline correction, etc.), and by connecting the adjacent pixels by a closing curved line as shown in FIG. 17, the substantially round region can be extracted as a suspected anomalous shadow.

Figure 18A:
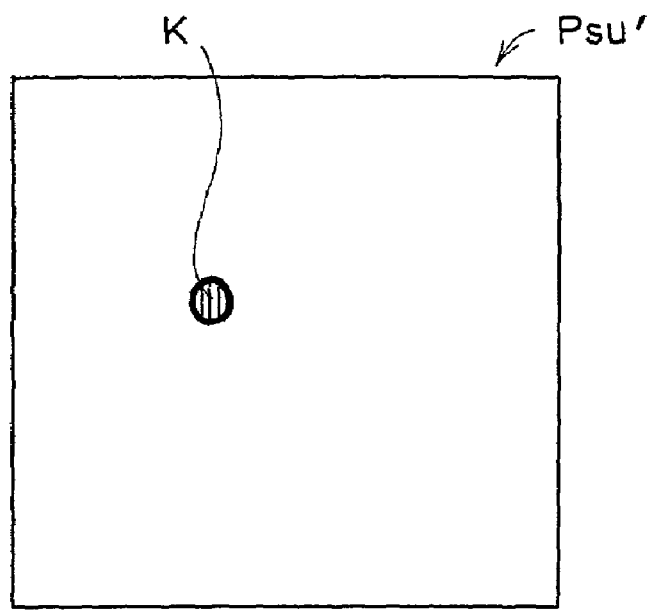
FIGS. 18A and 18B are a drawings illustrating the display state of a subtraction image in which the suspected anomalous shadows have been detected.
Figure 18B:
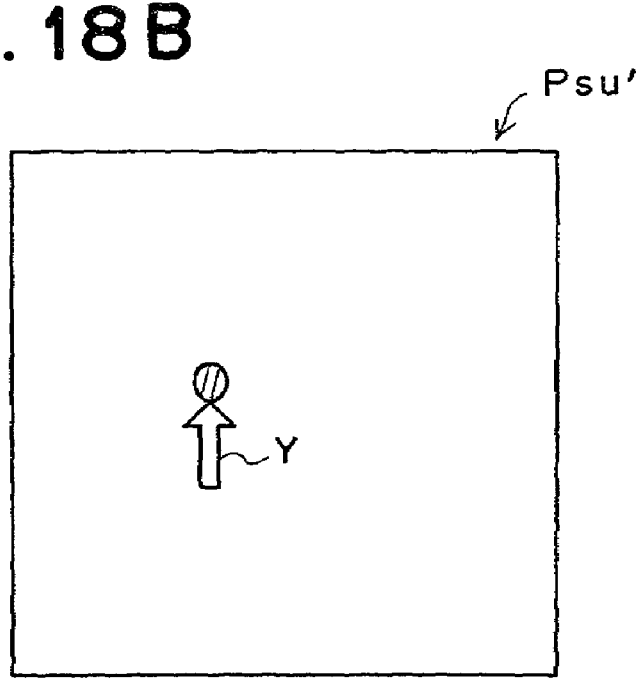

The image display means 20 displays the extracted anomalous shadow (the diseased portion K) as an emphasized region enclosed in a closed region, as shown in FIG. 18A. Note that the anomalous shadow, as shown in FIG. 18B, can be not only enclosed within the closed region, but also can be specified by an arrow indicator Y or the like.

Because the artifacts have been suppressed and the diseased portion K enhanced in the image displayed on the image display means 20 in this way, the presence of the diseased portion can be more accurately recognized visually.

According to the anomalous shadow detecting apparatus according to the current embodiment described in detail above, by subjecting an interimage image to an image process wherein the actual difference between the two images upon which said interimage is based is enhanced relative to the artifacts appearing therein, the artifacts, which have a negative effect on the diagnostic reading of the interimage image, can be reduced relative to the actual difference between the two images upon which said inter image is based, which is the area concern therein. Accordingly, the anomalous shadows can be detected with a high degree of accuracy with no negative effect due to the artifacts.

Note that the according to the above-described embodiment, although an opening-process morphology process has been applied to the high-density subtraction image Psu1, instead of this process, a highest-value filtering process can be applied, and the same result obtained by application of said opening-process can be obtained thereby. In the same manner, although a closing-process morphology process has been applied to the low-density subtraction image Psu2, instead of this process, a lowest-value filtering process can be applied, and the same result obtained by application of said closing-process can be obtained thereby.

Further, because in the artifacts occurring in a concentration image the density changes radically in a narrow range, these sharply defined artifacts can be searched for by use of a Laplacian filtering, and by subjecting the artifacts obtained by said search to a smoothing process, said artifacts can be suppressed relative to the diseased portion, etc. actual difference between the two images on which said concentration image is based. In the same manner, because the artifacts include more high frequency components than the actual difference that represents a diseased portion or the like, the detected high frequency components can be subjected to a blurring process. The blurring process to which the high-frequency components are subjected can consist of a Fourier transform followed by a deletion of the high-frequency components and a reverse Fourier transform, or a smoothing process employing a blurring mask. Note that for cases in which the above described anomalous shadow detecting apparatus according to the present invention is applied to a subject image such as a chest x-ray or the like, even if a blurring process is applied only in the vertical direction, an adequate result according to the present invention can be obtained with respect to the artifacts caused by the bone structures extending mainly in the horizontal direction.

Further, instead of performing a process to suppress the artifacts, the actual difference that represents a diseased portion or the like can be subjected to an enhancement process for enhancing said actual difference relative to the artifacts. For example, the low-frequency components forming the shadow of a tumor, etc. can be subjected to an enhancement process. Of course, it is permissible that both the suppressing of the artifacts and the enhancing of the actual difference be performed.

Note that according to the current embodiment, upon being subjected to the non-linear transform (warping), as shown in FIG. 5, the first image P1 does not maintain the shape (rectangular) of the original image. Accordingly, the post-warping image P1 is not an image having a rectangular outline such as that shown in FIG. 6A, but has an irregular outline formed of curved lines. O the other hand, because the second image P2 has not been subjected to any type of transformative process, said second image P2 has a rectangular outline. Accordingly, when correlating the pixels of both of said images and performing a subtraction process therebetween, there are cases for which there are pixels in the post-warping image P1 for which there are no corresponding pixels in the second image P2, and it is impossible to perform a subtraction process on such pixels.

At that point, for cases in which there are pixels in the image that has been subjected to the transform process (in the current embodiment, the first image P1) for which there are no corresponding pixels in the image that has not been subjected to the transform process (in the current embodiment, the second image P2), said pixels for which corresponding pixels are not present can be reset and the value of said reset pixels can be caused to be the same as that of the pixels of the corresponding image (the second image P2).

Further, as a method instead of this pixel compensation method, the pixels of the image serving as the base image can be deleted at the same time as those of the image that has been subjected to the transform process. This is due the fact that there are extremely few cases in which the image portions for which there are no corresponding pixels represent an area of interest with respect to the diagnostic reading, and said pixels can therefore be considered as unnecessary. Further developing this approach, only the area of interest in each of respective post-warping image (the first image P1) and bas image (the second image P2) can be extracted, so as to limit in advance the area of the images to be subjected to the subtraction process. In this manner, the computation amount is advantageously reduced by limiting in advance the area of the images to be subjected to the subtraction process. According to the embodiment described above, because chest x-ray images have been applied, it is preferable that a thorax recognition process, whereby all of the pixels representing portions outside of the chest cavity are assigned a uniform value, is performed on the post-warping image (the first image P1) and the base image (the second image P2). Note that, as to the thorax recognition process, the technology disclosed in Japanese unexamined Patent Publication No. 8(1996)-335271, etc. can be applied. Still further, according to the above-described embodiment, although the detecting means 13 divides the processed subtraction image Psu' into small regions having a size of 32×32 pixels, anomalous shadows occur in a variety of sizes; therefore, the processed subtraction image Psu' can be divided into series of small regions, each of a different size, for each iteration of which the above described process for detecting the small round regions occurring therein is performed, whereby various sizes of anomalous shadows can be detected.

In addition, according to the above-described embodiment, although substantially round shaped diseased portion K has been detected as an anomalous shadow, by use of a substantially rectangular shaped structuring element instead of a substantially round structural element by the image processing means 12 when obtaining the processed subtraction image Psu', the diseased portions having a substantially rectangular shape can be compared to the artifacts and enhanced relatively thereto. In this case, by the subjecting of the processed subtraction image Psu' to a template matching process employing a substantially rectangular template and performed by the detecting means 13, the substantially rectangular anomalous shadows can be detected.

What is claimed is:

1. A method of detecting suspected anomalous shadows, comprising:

obtaining a difference image representing a difference between two images, which have been obtained of a same subject at different photographing times, by subjecting said two images to an interimage process to obtain the difference between said two images, obtaining a processed difference image by subjecting the obtained difference image to an image process wherein an actual difference between the two images on which said difference image is based is enhanced relative to artifacts appearing due to misalignment of a position of a structural element of the subject on one of the two images from a corresponding position of the structural element on the other of the two images, and detecting the actual difference between the two images from the processed difference image as suspected anomalous shadows, wherein the image process is an image process that suppresses the artifacts more than the actual difference between the two images on which the difference image is based, and wherein the image process for suppressing the artifacts relative to the actual difference between the two images is a process based on a morphology process employing structuring elements that are larger than the artifacts while smaller than the actual difference; wherein the image process further comprises separating the difference image into a high-density image formed from portions of the difference image having a density equal to or higher than a predetermined density and a low-density image formed from portions having a density less than the predetermined density, applying said morphology process to both the high-density and low-density images, and combining the high-density and low-density images after the morphology process is applied.

2. A method of detecting suspected anomalous shadows as defined in claim 1, wherein
the image process is an image process that enhances the actual difference more than the artifacts.

3. A method of detecting suspected anomalous shadows as defined in any of claims 1 or 2, wherein
the interimage process is a subtraction process in which the structural positions of the two images are correlated and a subtraction process is performed therebetween.

4. A method of detecting suspected anomalous shadows as defined in any of claims 1 or 2, wherein
the two images upon which the difference image is based are radiation images that have been obtained of the same subject in a temporal series, each of said images having been obtained at a different time, and which become the objects of a comparison to determine temporal change.

5. A method of detecting suspected anomalous shadows as defined in any of claims 1 or 2, wherein
the substantially round-shaped differences from among the actual differences appearing in the processed difference image are detected as the suspected anomalous shadows.

6. The method of claim 1, wherein the interimage processing comprises global matching between corresponding structural elements within the two images obtained of the same subject and local matching between corresponding small local regions within the two images obtained of the same subject.

7. The method of claim 1, wherein the actual difference has one of a rectangular and a circular shape.

8. The method of claim 7, wherein the artifacts have an elongated shape.

9. The method of claim 1, wherein the difference image is a subtraction image.

10. An apparatus for detecting suspected anomalous shadows, comprising:
   an interimage processing means for obtaining a difference image representing a difference between two images, which have been obtained of a same subject at different photographing times, by subjecting said two images to an interimage process to obtain the difference between said two images,
   an image processing means for obtaining a processed difference image by subjecting said difference image to an image process wherein an actual difference between the two images on which said difference image is based is enhanced relative to artifacts appearing due to misalignment of a position of a structural element of the subject on one of the two images from a corresponding position of the structural element on the other of the two images, and
   a detecting means for detecting the actual difference between the two images from the processed difference image as suspected anomalous shadows, wherein the image processing means is a means for carrying out a process which suppresses the artifacts more than the actual difference between the two images, and wherein as a means for carrying out the process which suppresses the artifacts more than the actual difference between the two images, the image processing means performs a process based on a morphology process employing structuring elements that are larger than the artifacts while smaller than the actual difference; wherein the image process further comprises separating the difference image into a high-density image formed from portions of the difference image having a density equal to or higher than a predetermined density and a low-density image formed from portions having a density less than the predetermined density, applying said morphology process to both the high-density and low-density images, and combining the high-density and low-density images after the morphology process is applied.

11. An apparatus for detecting suspected anomalous shadows as defined in claim 8, wherein
   the image processing means is a means for carrying out a process which enhances the actual difference between two images more than the artifacts.

12. An apparatus for detecting suspected anomalous shadows as defined in any of claims 8 or 11, wherein
   the interimage process is a subtraction process in which the structural positions of the two images are correlated and a subtraction process is performed therebetween.

13. An apparatus for detecting suspected anomalous shadows as defined in any of claims 8 or 11, wherein
   the two images upon which the interimage image is based are radiation images that have been obtained of the same subject in a temporal series, each of said images having been obtained at a different time, and which become the objects of a comparison to determine temporal change.

14. An apparatus for detecting suspected anomalous shadows as defined in any of claims 8 or 11, wherein
   the detecting means is a means for detecting the substantially round-shaped differences from among the actual differences appearing in the processed difference image as the suspected anomalous shadows.

15. The apparatus of claim 10, wherein the interimage processing comprises global matching between corresponding structural elements within the two images obtained of the same subject and local matching between corresponding small local regions within the two images obtained of the same subject.

16. The apparatus of claim 10, wherein the actual difference has one of a rectangular and a circular shape.

17. The apparatus of claim 16, wherein the artifacts have an elongated shape.

18. The apparatus of claim 10, wherein the difference image is a subtraction image.

* * * * *